(12) United States Patent
Elangovan et al.

(10) Patent No.: US 11,794,694 B2
(45) Date of Patent: Oct. 24, 2023

(54) GESTURE-BASED REMOTE KEYLESS ENTRY FOR NFC KEYS

(71) Applicant: FORD GLOBAL TECHNOLOGIES, LLC, Dearborn, MI (US)

(72) Inventors: Vivekanandh Elangovan, Canton, MI (US); Jochen Schubert, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 62 days.

(21) Appl. No.: 17/400,573

(22) Filed: Aug. 12, 2021

(65) Prior Publication Data

US 2023/0050828 A1    Feb. 16, 2023

(51) Int. Cl.
*B60R 25/24* (2013.01)
*G06F 3/01* (2006.01)

(52) U.S. Cl.
CPC ............ *B60R 25/246* (2013.01); *G06F 3/017* (2013.01); *B60R 2325/103* (2013.01)

(58) Field of Classification Search
CPC .. B60R 25/246; B60R 2325/103; G06F 3/017
See application file for complete search history.

(56) References Cited

U.S. PATENT DOCUMENTS

| | | |
|---|---|---|
| 6,347,290 B1 | 2/2002 | Bartlett |
| 8,258,957 B2 | 9/2012 | Mickle et al. |
| 9,983,651 B2 | 5/2018 | Agrawal et al. |
| 2010/0214079 A1 | 8/2010 | Desjeux |
| 2011/0134251 A1 | 6/2011 | Kim et al. |
| 2017/0200335 A1* | 7/2017 | Da Deppo ......... G07C 9/00309 |
| 2020/0339066 A1* | 10/2020 | Park ..................... B60R 25/245 |
| 2022/0355763 A1* | 11/2022 | Patne ..................... H04W 4/38 |

OTHER PUBLICATIONS

English Translation of CN 113240833 (Year: 2021).*
English Translation of JP 2016204839 (Year: 2016).*
English Translation of CN 203551964 (Year: 2014).*

* cited by examiner

*Primary Examiner* — Patrick N Edouard
*Assistant Examiner* — Eboni N Giles
(74) *Attorney, Agent, or Firm* — Frank Lollo; Brooks Kushman P.C.

(57) ABSTRACT

Utilizing an access device is provided. A command mapping of user input to RKE commands is utilized to identify a RKE command based on the user input to one or more motion or orientation sensor of the access device. Responsive to the environmental input from one or more environmental sensors of the access device being indicative of command entry, a transceiver of the access device is activated, the RKE command is sent, and the transceiver is deactivated. Otherwise, the user input of the RKE command is ignored.

19 Claims, 5 Drawing Sheets

FIG. 5

GESTURE-BASED REMOTE KEYLESS ENTRY FOR NFC KEYS

TECHNICAL FIELD

Aspects of the disclosure generally relate to using gestures with an access device to provide remote keyless entry (RKE) commands to a vehicle.

BACKGROUND

Vehicle key fobs may be used to allow a user to gain access to a vehicle. Some fob devices operate such that when a button is pressed on the fob, the device sends a code to the vehicle to instruct the vehicle to unlock the vehicle. PEPS key fobs operate to provide response to a challenge pulse train sent by the vehicle, where if a proper response is received by the vehicle then the door may be unlocked by a user grasping the door handle.

Phone-as-a-key (PaaK) systems are being introduced to allow users to utilize their phones to unlock a vehicle without requiring a key fob device. These systems may operate similar to a key fob, but where the phone communicates with the vehicle over BLUETOOTH LOW ENERGY (BLE) or other mobile device wireless technologies. Key card systems are also being introduced, where the vehicle doors may be unlocked responsive to receipt of a signal from an exterior NFC sensors indicative of presence of the NFC key card.

SUMMARY

In one or more illustrative embodiments, an access device is provided. The access device includes one or more user input sensors configured to receive user input to the access device. The access device also includes one or more environmental sensors configured to receive environmental input regarding surroundings of the access device. The access device also includes a transceiver configured to send RKE commands. The access device also includes a controller programmed to utilize a command mapping to identify a RKE command based on the user input; responsive to the environmental inputs being indicative of command entry, activate the transceiver to send the RKE command; and otherwise, ignore the user input of the RKE command.

In one or more illustrative embodiments, a method for utilizing an access device is provided. A command mapping of user input to RKE commands is utilized to identify a RKE command based on the user input to one or more motion or orientation sensor of the access device. Responsive to the environmental inputs from one or more environmental sensors of the access device being indicative of command entry, a transceiver of the access device is activated, the RKE command is sent, and the transceiver is deactivated. Otherwise, the user input of the RKE command is ignored.

In one or more illustrative embodiments, a non-transitory computer-readable medium comprising instructions for operation of an access device that, when executed by a key controller, cause the key controller to perform operations including to receive user input to the access device from one or more user input sensors; receive environmental input regarding surroundings of the access device from one or more environmental sensors; utilize a command mapping of user input to the RKE commands to identify a RKE command based on the user input; responsive to the environmental inputs being indicative of command entry, activate a transceiver of the access device, send the RKE command, and deactivate the transceiver and otherwise, ignore the user input of the RKE command.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

NFC key cards may be used to unlock the vehicle and to start the vehicle. The NFC key card may operate as an active device, meaning the user actively taps the card to an exterior NFC location of the vehicle to unlock the vehicle and also taps the card in an interior NFC location of the vehicle to start the vehicle. This is opposed to a passive device, where the vehicle may unlock and/or start due to device proximity to the vehicle. NFC key cards may be implemented as an alternative to traditional vehicle key fobs. In some cases, it may be desirable for an NFC key card to be a primary credential that comes from the factory along with the vehicle.

Many users are comfortable with RKE function buttons, such as lock, unlock, remote start, and panic. Yet, key cards may not provide these RKE functions due to limitations in battery life and range from NFC or similar short-range RF communications. Moreover, most key cards do not include physical buttons to allow for RKE functions to be activated by the customer by pressing buttons on the key card. This is, in part, because the addition of buttons to the key cards adds unwanted protrusions and components that wear over time.

A gesture control system may be implemented with an improved key card or other access device. Responsive to performance of a gesture using the key card, a BLE transceiver or other RF radio system of the access device may be woken up, and an RKE command corresponding to the gesture may be sent. Different gestures (e.g., single, double, or triple taps; slowly repeated taps vs quick taps, etc.) may cause different commands to be sent by the access device. Moreover, such a system is expandable, and additional command triggers may be added through updating the mapping of gestures to RKE commands, whereas hardware changes are needed to add more physical buttons to the access device. Thus, performance of the gesture may provide a configurable and power-saving command input method to the NFC key card.

Figure 1:
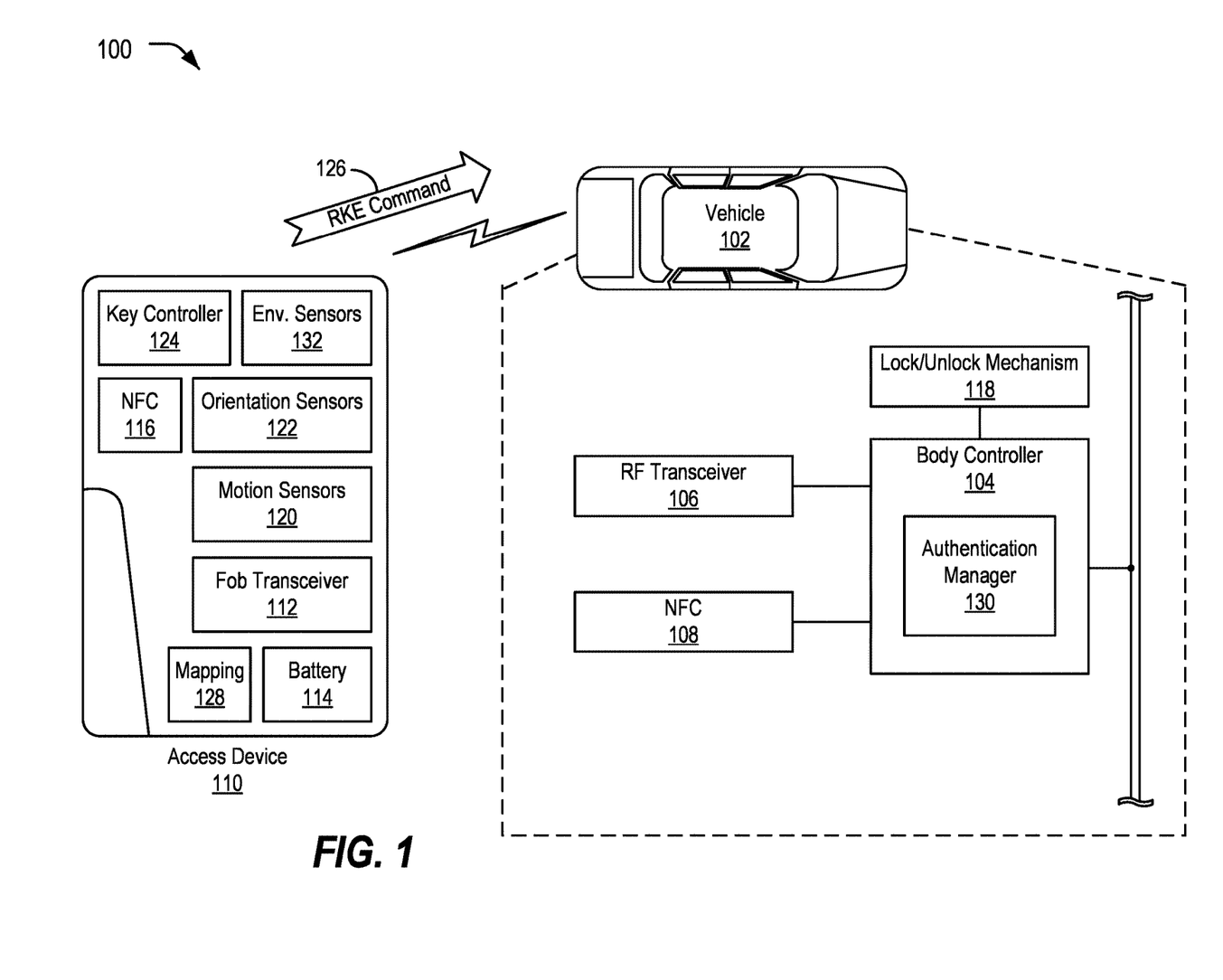
FIG. 1 illustrates an example keyless entry system for implementing power-saving gesture-based command triggers.

FIG. 1 illustrates an example keyless entry system 100 for a vehicle 102 implementing power-saving gesture-based command triggers. The vehicle 102 may include a body controller 104 in communication with a radio frequency (RF) transceiver 106, NFC sensors 108, and a lock/unlock mechanism 118. An access device 110 may be powered by a battery 114. The access device 110 may be in communication with the RF transceiver 106 via a transceiver 112 (e.g., BLE, UHF, etc.). The access device 110 may also be in communication with the NFC sensors 108 using NFC 116 functionality of the access device 110. As shown in FIG. 1, the access device 110 may be an NFC card. However, it should be noted that in other examples the access device 110 may be other types of device, such as a key fob (e.g., a fob without any buttons) a smart device such as watch, a mobile phone, or any other portable device configured as described herein.

The NFC sensors 108 of the vehicle 102 may include one or more sensors on the vehicle 102 exterior. These NFC sensors 108 may be used in conjunction with the access device 110 to request unlock or lock the vehicle 102 using NFC. Additionally, or alternately, the NFC sensors 108 may further include NFC sensors 108 within the vehicle 102 which may be used in conjunction with the access device 110 to request or authorize start of the vehicle 102.

A lock/unlock mechanism 118 may be operably coupled to the controller 104. For instance, the controller 104 may utilize the lock/unlock mechanism 118 to lock the doors of the vehicle 102 in response to receipt of a lock command from the access device 110, and to unlock the doors of the vehicle 102 in response receipt of an unlock command from the access device 110. In one example, the controller 104 may control the lock/unlock mechanism 118 to unlock the doors responsive to receipt of a signal from the exterior NFC sensors 108 indicative of presence of the NFC 116 functionality of the access device 110. In another example, the controller 104 may be configured to control the lock/unlock mechanism 118 to unlock/lock doors of the vehicle 102 in response to RKE commands 126 transmitted by the access device 110.

The access device 110 may include one or more motion sensors 120 to allow for the user to input gestures by way of the access device 110. In an example, the motion sensors 120 may include one or more accelerometers, such as a three-axis linear accelerometer. The motion sensors 120 may be used to allow the access device 110 to detect gestures of the user performed to the access device 110. For instance, the motion sensors 120 may be used to provide signals that indicate sudden changes in g-forces when the user taps the access device 110 with a finger or bumps the whole card against a hand or other object. The motion sensors 120 may be placed in various physical locations along or within the access device 110, such that gestures can be uniquely detected in or more distinct regions of the device (e.g., one of four quadrants when viewing the device in a two-dimensional plane). As one possibility, a series of motion sensors 120 may be placed in a line along the length of the access device 110. Or, a grid of motion sensors 120 may be placed along a face of the access device 110. Differences in reading from the different motion sensors 120 may be used to localize the tap locations. In an example, a first reading from a first motion sensor 120 followed in time by readings from other motion sensors 120 of lesser magnitude may locate the tap closer to the first motion sensor 120.

The access device 110 may further include one or more orientation sensors 122. These orientation sensors 122 may include, as some examples, one or more gravity sensors and/or gyroscopes. The orientation sensors 122 may be used to detect the orientation of the access device 110, such as right side up or right side down. The orientation sensors 122 may also be used to detect intentional orientation changes of the access device 110 (e.g., flip actions, rotate actions, etc.) which can be used to trigger different actions or to put the access device 110 into different states. This orientation data may, in some examples, be combined with the tap detection as an approach to distinguish different types of commands.

The changes in g-force detected by the motion sensors 120 and/or changes in orientation detected by the orientation sensors 122 may be provided to a key controller 124 of the access device 110. The key controller 124 may receive the signals and use the signals to determine whether the user intended to send a certain RKE command 126 to the vehicle 102. If so, the key controller 124 may wake up the fob transceiver 112 (e.g., a BLE chip) and use the fob transceiver 112 to send the requested RKE command 126.

The access device 110 may maintain a command mapping 128 defining a mapping of user inputs to RKE commands 126. A command mapping 128 may be used by the key controller 124 to identify the command that was input. Different gestures based on the detected actions, such as single tap, double tap, triple tap, flip, rotation, etc., may be used to signify different RKE commands 126. A unique pattern of taps and pauses may also be detectable to trigger functions (e.g., double tap—pause— double tap for trunk release). These patterns may be stored to the command mapping 128 in association with the corresponding RKE commands.

In many examples, a default command mapping 128 may be installed to the access device 110 (e.g., from the factory). In some examples, new command mapping 128 may be deployed to the access device 110 via updated software for the access device 110. It some examples, the command mapping 128 may also be user configurable. For instance, user-configured mappings may be provided over NFC from the vehicle 102, from a mobile device, or from another NFC device to the access device 110. The user may utilize an application on the vehicle 102, mobile device, etc. to configure which commands are mapped to which specific detected gesture.

The controller 104 may include an authentication manager 130. The authentication manager 130 may utilize the NFC 108 functionality of the vehicle 102 to sense the NFC 116 functionality of the access device 110 within the vehicle 102 cabin, which may cause the authentication manager 130 of the body controller 104 to allow the user to start the engine of the vehicle 102. The authentication manager 130 may also authenticate the requested RKE command 126 transmitted by the fob transceiver 112 to allow the user to start the engine of the vehicle 102.

In some examples, the access device 110 may also include environmental sensors 132 configured to provide additional contextual information to the key controller 124. This contextual information may be used by the access device 110 to differentiate between actual user requests for RKE commands 126 vs. transportation or jostling of the access device 110. In an example, the environmental sensors 132 may include proximity sensors, light sensors, flex sensors, and/or force sensitive resistors embedded into the access device 110. The key controller 124 may utilize signals from the environmental sensors 132 to determine whether to activate fob transceiver 112 and provide an RKE command 126 based on input from the motion sensors 120 and/or orientation sensors 122, or to ignore the input and not activate the fob transceiver 112. For instance, the key controller 124 may determine the access device 110 is located in a bag or pocket based on the signals from the environmental sensors 132 indicating that the access device 110 is in the dark, in close proximity to another object (e.g., indicative of being in a bag with other objects), and/or a slight bend in the access device 110 is detected (e.g., indicative of a card being in a wallet). If so, then events from the motion sensors 120 and/or orientation sensors 122 may be determined to be extraneous and be ignored.

The access device 110 may default to operation in an idle mode in which the fob transceiver 112 is not powered by the battery 114 but the motion sensors 120, orientation sensors 122, and/or environmental sensors 132 are powered. This may be done to minimize the battery 114 drain of the access device 110, as the fob transceiver 112 may be relatively power intensive to operate compared to the other components of the access device 110. Sudden changes in linear motion or orientation that indicate valid RKE commands 126 may be used by the key controller 124 to wake up the access device 110 into a transmit mode in which the fob transceiver 112 is powered. When the access device 110 is idle but the signals from the environmental sensors 132 indicate transport of the access device 110 but not command entry, the access device 110 refrains from waking up the fob transceiver 112, thereby conserving battery 114 power.

Figure 2:
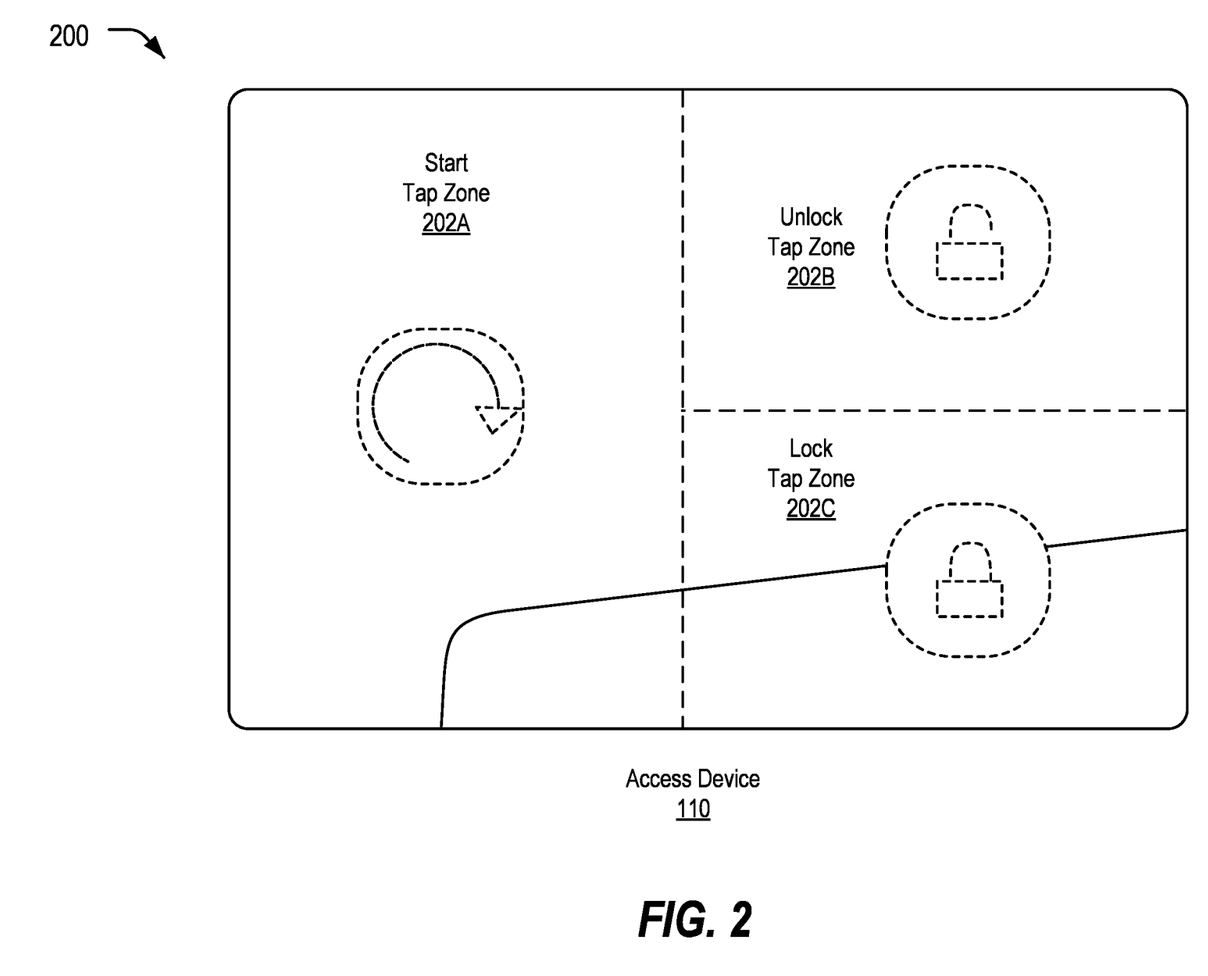
FIG. 2 illustrates an example of tap zones on a face of the access device.

FIG. 2 illustrates an example 200 of tap zones 202A, 202B, 202C (collectively tap zones 202) on a face of the access device 110. Sensors 120, 122 may be positioned in a way such that the key controller 124 may detect taps from the user in different relative locations (i.e., above or below, left or right on a 2-dimensional plane). In an example, sensors 120 may be placed in each of the target tap areas. The motion sensors 120 and/or orientation sensors 122 may detect subtle differences in the pitch, roll, and yaw being applied to the access device 110 based on where the user is tapping the access device 110. Patterns of change in those values along with an optimized machine learning function (e.g., a small, pre-trained feed-forward neural network) may be utilized within the access device 110 to more accurately determine which tap zone 202 was gestured by the user. These tap zones 202 may be labeled on the face of the access device 110 with icons for different commands. In the illustrated example a start tap zone 202A is located on the left of the access device 110, an unlock tap zone 202B is located on the upper right of the access device 110, and a lock tap zone 202C is located on the lower right of the access device 110.

RKE commands 126 may be provided to the vehicle 102 by tapping the access device 110 in the tap zones 202. For instance, a double tap into the unlock tap zone 202B may be used to cause the access device 110 to send a command to unlock the vehicle 102, a double tap in the lock tap zone 202C may be used to cause the access device 110 to send a command to lock the vehicle 102, and a triple tap in the start tap zone 202A may be used to cause the access device 110 to send a command to remote start the vehicle 102. In one example, the motion sensors 120 may be positioned in an off-center location to give certain tap zones less motion sensitivity and a lower false-positive detection rate compared to other tap zones (e.g., the start tap zone 202A should be more difficult to triggered than the tap zones 202B, 202C).

Figure 3:
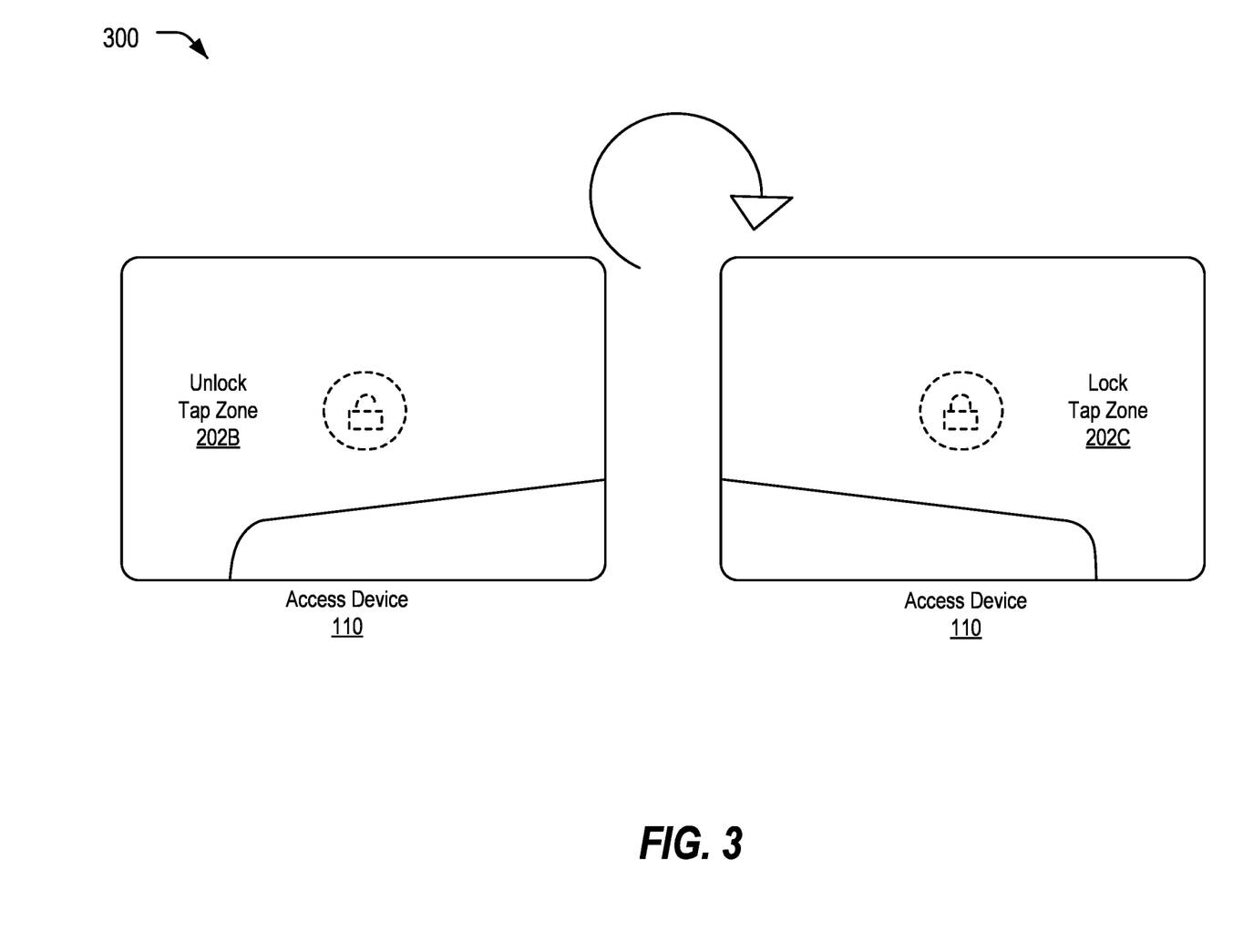
FIG. 3 illustrates an example of tap zones that differ based on the orientation of the access device.

FIG. 3 illustrates an example 300 of tap zones 202 that differ based on the orientation of the access device 110. For example, when the access device 110 is held face up, the face of the access device 110 may define an unlock tap zone 202B, such that a double tap on the access device 110 may be used to unlock the vehicle 102. But, if the access device 110 is flipped over, the face of the access device 110 may define a lock tap zone 202C, such that a double tap on the access device 110 may be used to lock the vehicle 102.

Figure 4:
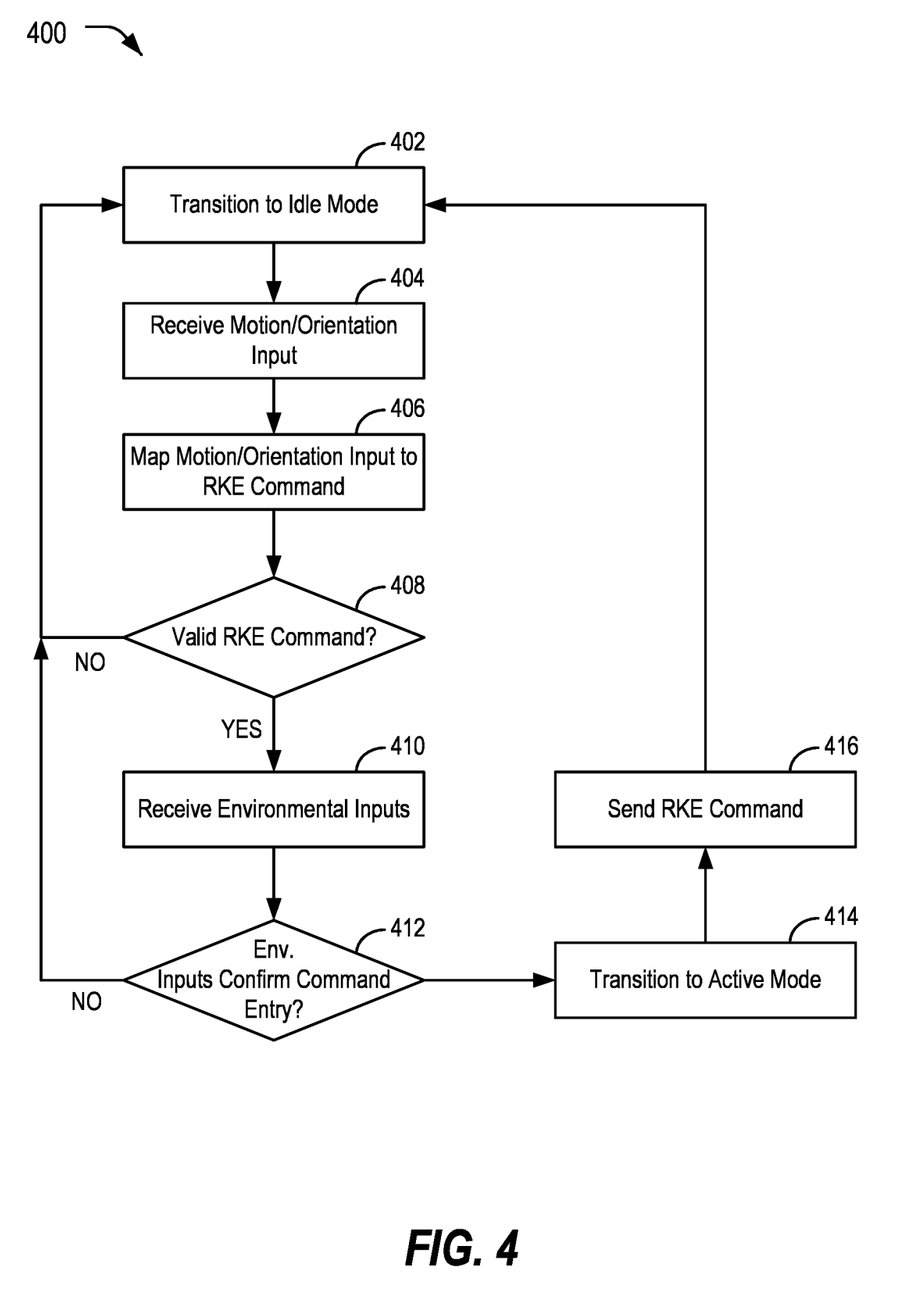
FIG. 4 illustrates an example process for implementing the power-saving gesture-based command triggers.

FIG. 4 illustrates an example process 400 for implementing the power-saving gesture-based command triggers. In an example, the process 400 may be performed by the access device 110 discussed in detail above.

At operation 402, the access device 110 transitions to an idle mode. In the idle mode, the fob transceiver 112 is not powered by the battery 114 but the motion sensors 120, orientation sensors 122, and/or environmental sensors 132 are powered. Thus, in the idle mode, the access device 110 awaits user input without any drain on the battery 114 due to operation of the fob transceiver 112.

At operation 404, the access device 110 receives motion and/or orientation input. In an example, the key controller 124 of the access device 110 may receive signals indicative motion input from the motion sensors 120. The motion input may be a result of g-force changes indicative of a user tapping on the access device 110. Or, the motion input may be a result of jostling of the access device 110 during transport, not intentional user input. In another example, the access device 110 may receive signals indicative of orientation changes from the orientation sensors 122. This orientation input may be a result of user turning or other manipulation of the access device 110. Or, similarly, the orientation input may be a result of jostling of the access device 110 during transport, not intentional user input.

At operation 406, the access device 110 maps the motion and/or orientation input to an RKE command 126. For instance, the access device 110 may utilize the command mapping 128 of motion and/or orientation input to translate the user input into a RKE command 126.

At operation 408, the access device 110 determines whether a valid RKE command 126 was entered. In an example, if the command mapping 128 fails to indicate a match for the entered motion and/or orientation input, control returns to operation 402. This may occur, for example if the access device 110 is jostled or transported. If a RKE command 126 is entered, control proceeds to operation 410.

At operation 410, the access device 110 receives environmental inputs from the environmental sensors 132. In an example, these environmental inputs may include signals from one or more of proximity sensors, light sensors, flex sensors, and/or force sensitive resistors embedded into the access device 110. In some examples, the access device 110 may maintain a buffer of recent environmental inputs, e.g., sampled concurrent with the receipt of motion and/or orientation input, in order to measure conditions at the time of command entry. In other examples, the environmental inputs from the environmental sensors 132 may be sampled responsive to determination of entry of a seemingly value RKE command 126 at operation 408.

At operation 412, the access device 110 determines whether the inputs from the environmental sensors 132 confirm entry of the RKE command 126. The key controller 124 may utilize the signals from the environmental sensors 132 to determine whether to activate fob transceiver 112 and provide an RKE command 126 based on input from the motion sensors 120 and/or orientation sensors 122, or to ignore the input and no activate the fob transceiver 112. For instance, the key controller 124 may determine the access device 110 is located in a bag or pocket based on the signals from the environmental sensors 132 indicating that the access device 110 is in the dark, in close proximity to another object (e.g., in a pocket or purse), and/or a slight bend in the access device 110 is detected (e.g., indicative of a card being in a wallet). If so, then control passes to operation 402 to ignore the entered RKE command 126. It not, then control continues to operation 414.

At operation 414, the access device 110 transitions to the active mode. For instance, the access device 110 may activate fob transceiver 112. At operation 416, the access device 110 utilizes the fob transceiver 112 to provide the determined RKE command 126. After operation 416, control proceeds to operation 402.

Variations on the process 400 are possible. In another example, if environmental sensors 132 indicate to ignore input, then input from the sensors 120, 122 may be ignored without checking to see if a match to the command mapping 128 was entered.

Figure 5:
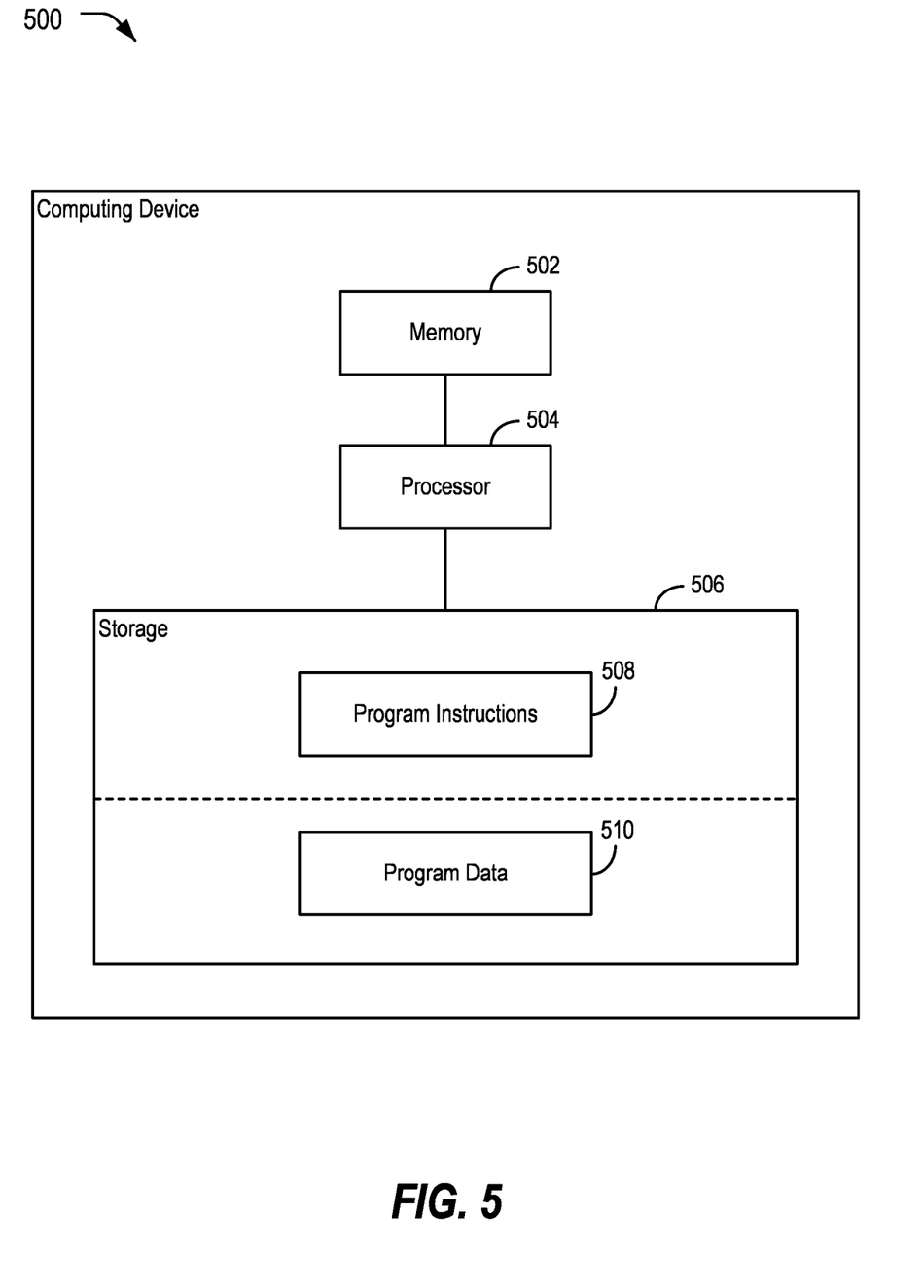
FIG. 5 illustrates an example computing device for use in implementing the power-saving gesture-based command triggers.

FIG. 5 illustrates an example computing device 500 for implementing power-saving gesture-based command triggers. Devices discussed herein, such as the body controller 104 and access device 110 may include devices such as the computing device 500. Likewise, the operations performed herein, such as those of the process 400, may be implemented with such computing devices 500. The computing device 500 may include memory 502, processor 504, and non-volatile storage 506. The processor 504 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 502. The memory 502 may include a single memory device or a number of memory devices including, but not limited to, random access memory (RAM), volatile memory, non-volatile memory, static random-access memory (SRAM), dynamic random access memory (DRAM), flash memory, cache memory, or any other device capable of storing information. The non-volatile storage 506 may include one or more persistent data storage devices such as a hard drive, optical drive, tape drive, non-volatile solid-state device, cloud storage or any other device capable of persistently storing information.

The processor 504 may be configured to read into memory 502 and execute computer-executable instructions residing in program instructions 508 of the non-volatile storage 506 and embodying algorithms and/or methodologies of one or more embodiments. The program instructions 508 may include operating systems and applications. The program instructions 508 may be compiled or interpreted from computer programs created using a variety of programming languages and/or technologies, including, without limitation, and either alone or in combination, Java, C, C++, C#, Objective C, Fortran, Pascal, Java Script, Python, Perl.

Upon execution by the processor 504, the computer-executable instructions of the program instructions 508 may cause the computing device 500 to implement one or more of the algorithms and/or methodologies disclosed herein. The non-volatile storage 506 may also include program data 510 supporting the functions, features, and processes of the one or more embodiments described herein.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A portable access device comprising:
   one or more user input sensors configured to receive user input applied to the access device, the one or more user input sensors including one or more motion or orientation sensors configured to sense motion or orientation of the access device;
   one or more environmental sensors configured to receive environmental input regarding surroundings of the access device;
   a transceiver configured to send remote keyless entry (RKE) commands; and
   a controller programmed to
      utilize a command mapping of motion or orientation user input to the RKE commands to identify which RKE command of the RKE commands to perform based on the motion or orientation user input;
      responsive to the environmental input being indicative of command entry, activate the transceiver to send the RKE command; and
      otherwise, ignore the user input of the RKE command,
   wherein a first region on a top face of the access device is configured for input of a first RKE command; and a second region on a bottom face of the access device is configured for input of a second RKE command, the one or more user input sensors include an orientation sensor configured to determine whether the top face or the bottom face is facing upward and an accelerometer configured to detect changes in g-force responsive to tapping, such that the first RKE command is indicated by the command mapping responsive to the top face of the access device facing upward during the tapping and the second RKE command is indicated by the command mapping responsive to the bottom face of the access device facing upward during the tapping.

2. The access device of claim 1, wherein the user input includes tapping on the access device, and the one or more user input sensors include an accelerometer configured to detect changes in g-forces responsive to the tapping.

3. The access device of claim 1, wherein the user input includes rotation of the access device, and the one or more user input sensors include an orientation sensor configured to detect changes in orientation responsive to the rotation.

4. The access device of claim 1, wherein the controller is further programmed to deactivate the transceiver responsive to sending the RKE command.

5. The access device of claim 1, further comprising a plurality of labeled regions on a face of the access device, wherein the one or more user input sensors are positioned to differentiate and detect input from the user received to each of the plurality of labeled regions.

6. The access device of claim 5, wherein the plurality of labeled regions includes a start tap zone configured to receive tap input to send a remote start RKE command, an unlock tap configured to receive tap input to send an unlock RKE command zone, and a lock tap zone configured to receive tap input to send a lock RKE command.

7. The access device of claim 1, wherein the one or more environmental sensors include a proximity sensor configured to detect proximity to an object, and the controller is programmed to determine the environmental input is indicative of command entry responsive to lack of detection of the object by the proximity sensor.

8. The access device of claim 1, wherein the one or more environmental sensors include a light sensor configured to detect ambient light, and the controller is programmed to determine the environmental input is indicative of command entry responsive to detection of ambient light.

9. The access device of claim 1, wherein the one or more environmental sensors include flex sensors, and/or force sensitive resistors embedded into the access device configured to detect bending of the access device, and the controller is programmed to determine the environmental input is indicative of command entry responsive to an absence of bending of the access device.

10. The access device of claim 1, further comprising a near field communication (NFC) sensor, wherein the controller is further programmed to receive the command mapping via NFC communication to the NFC sensor.

11. A method for utilizing a portable access device, comprising:
   receiving motion or orientation user input to one or more motion or orientation sensors configured to sense motion or orientation of the access device;
   utilizing a command mapping of motion or orientation user input to remote keyless entry (RKE) commands to identify which RKE command of the RKE commands to perform based on the motion or orientation user input, the command mapping including mapping a first region on a top face of the access device for input of a first RKE command and mapping a second region on a bottom face of the access device for input of a second RKE command;
   responsive to environmental input from one or more environmental sensors of the access device being indicative of command entry,
      determining whether the top face or the bottom face is facing upward using the one or more motion or orientation sensors;

detecting changes in g-force responsive to the user input using the one or more motion or orientation sensors;

indicating the first RKE command responsive to the top face of the access device facing upward during the user input;

indicating the second RKE command responsive to the bottom face of the access device facing upward during the user input;

activating a transceiver of the access device, sending the indicated RKE command, and deactivating the transceiver; and otherwise, ignore the user input of the RKE command.

12. The method of claim 11, further comprising differentiating the user input as being received one of a plurality of labeled regions on a face of the access device.

13. The method of claim 12, wherein the plurality of labeled regions includes a start tap zone for receiving tap input to send a remote start RKE command, an unlock tap for receiving tap input to send an unlock RKE command zone, and a lock tap zone for receiving tap input to send a lock RKE command.

14. The method of claim 11, wherein one or more of:

the one or more environmental sensors include a proximity sensor configured to detect proximity to an object, and further comprising determining the environmental input is indicative of command entry responsive to lack of detection of the object by the proximity sensor;

the one or more environmental sensors include a light sensor configured to detect ambient light, and further comprising determining the environmental input is indicative of command entry responsive to detection of ambient light; or the one or more environmental sensors include flex sensors, and/or force sensitive resistors embedded into the access device configured to detect bending of the access device, and further comprising determining the environmental input is indicative of command entry responsive to an absence of bending of the access device.

15. The method of claim 11, further comprising receiving the command mapping via NFC communication to an NFC sensor of the access device.

16. A non-transitory computer-readable medium comprising instructions for operation of an access device that, when executed by a key controller, cause the key controller to perform operations including to:

receive motion or orientation user input to the access device from one or more user input sensors, the one or more user input sensors including one or more motion or orientation configured to sense motion or orientation of the access device;

receive environmental input regarding surroundings of the access device from one or more environmental sensors;

utilize a command mapping of motion or orientation user input to remote keyless entry (RKE) commands to identify which RKE command of the RKE commands to perform based on the motion or orientation user input, the command mapping including mapping a first region on a top face of the access device for input of a first RKE command and mapping a second region on a bottom face of the access device for input of a second RKE command;

responsive to the environmental input being indicative of command entry, determine whether the top face or the bottom face is facing upward using the one or more motion or orientation sensors, detect changes in g-force responsive to the user input using the one or more motion or orientation sensors, indicate the first RKE command responsive to the top face of the access device facing upward during the user input; indicate the second RKE command responsive to the bottom face of the access device facing upward during the user input, activate a transceiver of the access device, send the indicated RKE command, and deactivate the transceiver; and otherwise, ignore the user input of the RKE command.

17. The medium of claim 16, the access device comprising a plurality of labeled regions on a face of the access device, the medium further comprising instructions that, when executed by the key controller, cause the key controller to perform operations including to differentiate and detect user input from the user received to each of the plurality of labeled regions.

18. The medium of claim 16, further comprising receive the command mapping via NFC communication to an NFC sensor of the access device.

19. The medium of claim 16, wherein one or more of:

the one or more environmental sensors include a proximity sensor configured to detect proximity to an object, and further comprising instructions that, when executed by the key controller, cause the key controller to perform operations including to determine the environmental input is indicative of command entry responsive to lack of detection of the object by the proximity sensor;

the one or more environmental sensors include a light sensor configured to detect ambient light, and further comprising instructions that, when executed by the key controller, cause the key controller to perform operations including to determine the environmental input is indicative of command entry responsive to detection of ambient light; or the one or more environmental sensors include flex sensors, and/or force sensitive resistors embedded into the access device configured to detect bending of the access device, and further comprising instructions that, when executed by the key controller, cause the key controller to perform operations including to determine the environmental input is indicative of command entry responsive to an absence of bending of the access device.

* * * * *